(12) United States Patent
Dunjic et al.

(10) Patent No.: US 12,192,267 B2
(45) Date of Patent: *Jan. 7, 2025

(54) SYSTEM AND METHOD FOR ENABLING ONE OR MORE TRANSFER FEATURES ASSOCIATED WITH A REAL-TIME TRANSFER PROTOCOL

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA); Vipul Kishore Lalka, Oakville (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/351,614

(22) Filed: Jul. 13, 2023

(65) Prior Publication Data

US 2023/0362233 A1 Nov. 9, 2023

Related U.S. Application Data

(63) Continuation of application No. 17/392,634, filed on Aug. 3, 2021, now Pat. No. 11,750,686.

(51) Int. Cl.
*H04L 67/06* (2022.01)
*H04L 9/40* (2022.01)
(Continued)

(52) U.S. Cl.
CPC .............. *H04L 67/06* (2013.01); *H04L 41/22* (2013.01); *H04L 63/104* (2013.01); *H04L 63/20* (2013.01); *H04L 67/01* (2022.05)

(58) Field of Classification Search
CPC ....... H04L 67/06; H04L 41/22; H04L 63/104; H04L 63/20; H04L 67/01; H04L 63/1433
See application file for complete search history.

(56) References Cited

U.S. PATENT DOCUMENTS

| 8,600,873 B2 | 12/2013 | Fisher |
| 8,700,729 B2 | 4/2014 | Dua |

(Continued)

FOREIGN PATENT DOCUMENTS

KR 101904973 B1 10/2018

OTHER PUBLICATIONS

Lee: "A data mining approach using transaction patterns for card fraud detection", published in arXiv preprint arXiv:1306.5547, https://arxiv.org/pdf/1306.5547, publication date Jul. 5, 2005.

*Primary Examiner* — El Hadji M Sall
(74) *Attorney, Agent, or Firm* — Rowand LLP

(57) ABSTRACT

A server computer system, comprises a processor; a communications module coupled to the processor; and a memory coupled to the processor, the memory storing instructions that, when executed, configure the processor to receive, via the communications module and from a client device, a signal including a request to configure a transfer of data to a particular data record; determine that the particular data record is associated with a third party server; obtain a trust score associated with the particular data record; determine that the trust score satisfies trust criteria; and responsive to determining that the trust score satisfies trust criteria, enable one or more transfer features associated with a real-time transfer protocol.

25 Claims, 11 Drawing Sheets

(51) Int. Cl.
  *H04L 41/22* (2022.01)
  *H04L 67/01* (2022.01)

(56) References Cited

U.S. PATENT DOCUMENTS

| | | |
|---|---|---|
| 8,924,279 B2 | 12/2014 | Liu et al. |
| 9,185,095 B1 | 11/2015 | Moritz et al. |
| 9,219,723 B1 | 12/2015 | Potash et al. |
| 9,355,155 B1 | 5/2016 | Cassel et al. |
| 9,501,791 B2 | 11/2016 | Dziuk |
| 9,578,043 B2 | 2/2017 | Mawji et al. |
| 9,609,279 B2 * | 3/2017 | Morten .................. G06F 21/50 |
| 10,127,501 B2 | 11/2018 | Grigoryan et al. |
| 10,432,605 B1 | 10/2019 | Lester et al. |
| 10,635,829 B1 * | 4/2020 | Barker ................ H04L 63/102 |
| 10,878,387 B2 | 12/2020 | Weinflash |
| 2006/0212931 A1 * | 9/2006 | Shull .................... H04L 63/104 |
| | | 726/10 |
| 2016/0239831 A1 | 8/2016 | Saunders |
| 2017/0195359 A1 | 7/2017 | Grigoryan |
| 2017/0373933 A1 * | 12/2017 | Subramanian .... G06F 16/24578 |
| 2018/0039989 A1 | 2/2018 | Beye et al. |
| 2018/0374151 A1 | 12/2018 | Joshi |
| 2019/0370813 A1 | 12/2019 | Bravick et al. |
| 2020/0027089 A1 | 1/2020 | Kuchar et al. |

\* cited by examiner

SYSTEM AND METHOD FOR ENABLING ONE OR MORE TRANSFER FEATURES ASSOCIATED WITH A REAL-TIME TRANSFER PROTOCOL

CROSS-REFERENCE TO RELATED APPLICATIONS

This application is a continuation of U.S. patent application Ser. No. 17/392,634, filed on Aug. 3, 2021, the entire contents of which are incorporated herein by reference.

TECHNICAL FIELD

The present disclosure relates to systems and methods for enabling one or more transfer features associated with a real-time transfer protocol.

BACKGROUND

Transfer protocols may be used to transfer data between data records. Multiple transfer protocols may be available to complete the transfer however this may be unknown to the party initiating the data transfer. As such, the data transfer may be completed using a transfer protocol that is undesirable.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
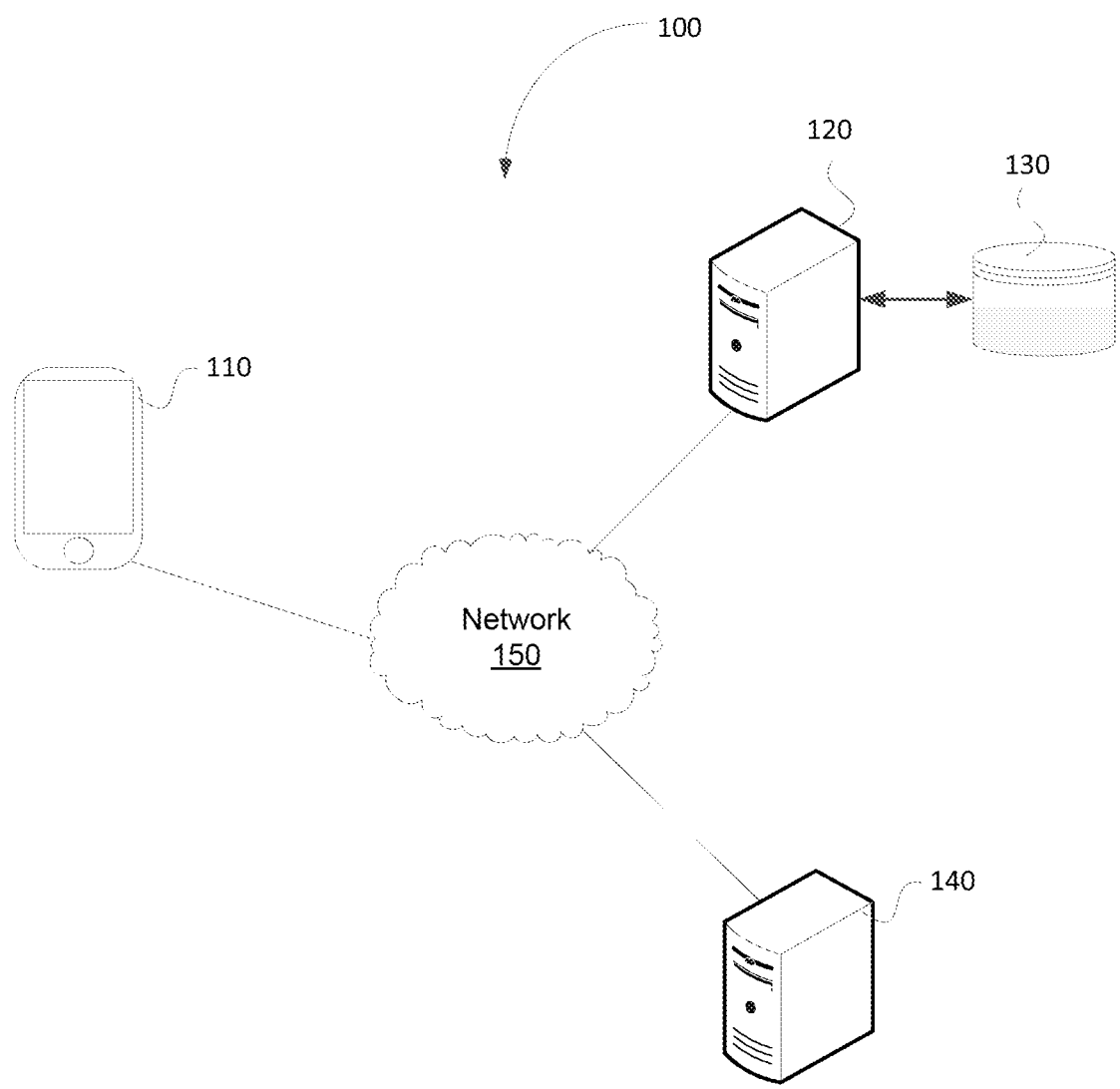
FIG. 1 is a schematic diagram illustrating an operating environment of an example embodiment.

In an aspect there is provided a server computer system, comprising a processor; a communications module coupled to the processor; and a memory coupled to the processor, the memory storing instructions that, when executed, configure the processor to receive, via the communications module and from a client device, a signal including a request to configure a transfer of data to a particular data record; determine that the particular data record is associated with a third party server; obtain a trust score associated with the particular data record; determine that the trust score satisfies trust criteria; and responsive to determining that the trust score satisfies trust criteria, enable one or more transfer features associated with a real-time transfer protocol.

In one or more embodiments, when enabling the one or more transfer features associated with the real-time transfer protocol, the instructions, when executed, further configure the processor to send, via the communications module and to the client device, a signal modifying a user interface displayed on the client device indicating the enabling of the one or more transfer features associated with the real-time transfer protocol.

In one or more embodiments, when enabling the one or more transfer features associated with the real-time transfer protocol, the instructions, when executed, further configure the processor to send, via the communications module and to the client device, a signal enabling a selectable option on a user interface displayed on the client device to initiate the transfer of the data to the particular data record using the real-time transfer protocol.

In one or more embodiments, the instructions, when executed, further configure the processor to receive, via the communications module and from the client device, a signal indicating selection of the selectable option to initiate the transfer to the particular data record using the real-time transfer protocol; and responsive to receiving the signal indicating selection of the selectable option to initiate the transfer to the particular data record using the real-time transfer protocol, initiate the transfer of the data to the particular data record using the real-time transfer protocol.

In one or more embodiments, the instructions, when executed, further configure the processor to determine that the transfer of the data to the particular data record using the real-time transfer protocol has completed; and responsive to determining that the transfer of the data to the particular data record using the real-time transfer protocol has completed, update a database to increase the trust score for the particular data record.

In one or more embodiments, when enabling the one or more transfer features associated with the real-time transfer protocol, the instructions, when executed, further configure the processor to enable an increased transfer threshold for the transfer using the real-time transfer protocol.

In one or more embodiments, the increased transfer threshold is based on the trust score associated with the particular data record.

In one or more embodiments, the trust criteria includes a trust threshold and determining that the trust score satisfies the trust criteria includes determining that the trust score is above the trust threshold.

In one or more embodiments, when obtaining the trust score for the particular data record, the instructions, when executed, further configure the processor to send, to a database, a signal that includes information identifying the particular data record and requesting the trust score associated with the particular data record.

In one or more embodiments, the instructions, when executed, further configure the processor to receive, via the communications module and from a second client device, a signal including a second request to configure a second transfer of data to a second particular data record; determine that the second particular data record is associated with the third party server; obtain a second trust score associated with the second particular data record; determine that the second trust score does not satisfy the trust criteria; and responsive to determining that the second trust score does not satisfy the trust criteria, send, via the communications module and to the second client device, a signal causing a second user interface displayed on the second client device to display a notification indicating that the second particular data record cannot be trusted.

In another aspect there is provided a computer-implemented method comprising receiving, from a client device, a signal including a request to configure a transfer of data to a particular data record; determining that the particular data record is associated with a third party server; obtaining a trust score associated with the particular data record; determining that the trust score satisfies trust criteria; and responsive to determining that the trust score satisfies trust criteria, enabling one or more transfer features associated with a real-time transfer protocol.

In one or more embodiments, enabling the one or more transfer features associated with the real-time transfer protocol includes sending, to the client device, a signal modifying a user interface displayed on the client device indicating the enabling of the one or more transfer features associated with the real-time transfer protocol.

In one or more embodiments, enabling the one or more transfer features associated with the real-time transfer protocol includes sending, to the client device, a signal enabling a selectable option on a user interface displayed on the client device to initiate the transfer of the data to the particular data record using the real-time transfer protocol.

In one or more embodiments, the method further comprises receiving, from the client device, a signal indicating selection of the selectable option to initiate the transfer to the particular data record using the real-time transfer protocol; and responsive to receiving the signal indicating selection of the selectable option to initiate the transfer to the particular data record using the real-time transfer protocol, initiate the transfer of the data to the particular data record using the real-time transfer protocol.

In one or more embodiments, the method further comprises determining that the transfer of the data to the particular data record using the real-time transfer protocol has completed; and responsive to determining that the transfer of the data to the particular data record using the real-time transfer protocol has completed, updating a database to increase the trust score for the particular data record.

In one or more embodiments, enabling the one or more transfer features associated with the real-time transfer protocol includes enabling an increased transfer threshold for the transfer using the real-time transfer protocol.

In one or more embodiments, the increased transfer threshold is based on the trust score associated with the particular data record.

In one or more embodiments, the trust criteria includes a trust threshold and determining that the trust score satisfies the trust criteria includes determining that the trust score is above the trust threshold.

In one or more embodiments, obtaining the trust score for the particular data record includes sending, to a database, a signal that includes information identifying the particular data record and requesting the trust score associated with the particular data record.

According to another aspect there is provided a non-transitory computer readable storage medium comprising processor-executable instructions which, when executed, configure a processor to receive, via a communications module and from a client device, a signal including a request to configure a transfer of data to a particular data record; determine that the particular data record is associated with a third party server; obtain a trust score associated with the particular data record; determine that the trust score satisfies trust criteria; and responsive to determining that the trust score satisfies trust criteria, enable one or more transfer features associated with a real-time transfer protocol.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates an exemplary system 100 consistent with certain disclosed embodiments. As shown in FIG. 1, the system 100 may include a client device 110, a server computer system 120, a database 130 associated with the server computer system 120, a transfer protocol server 140, and a network 150 connecting one or more of the components of the system 100.

The client device 110 may be a computing device. The client device 110 may take a variety of forms including, for example, a mobile communication device such as a smartphone, a tablet computer, a wearable computer (such as a head-mounted display or smartwatch), a laptop or desktop computer, or a computing device of another type. The client device 110 may be associated with a client entity (e.g., an individual, an organization, etc.) having resources that are managed by or via the server computer system 120. For example, the server computer system 120 may be a financial institution server and the client entity may be a customer of a financial institution operating the financial institution server. The client device 110 may store software instructions that cause the client device 110 to establish communications with the server computer system 120.

The server computer system 120 may maintain a database that includes various data records. For example, the server computer system 120 may be a financial institution server which may maintain customer bank accounts. In this example, a data record may, for example, reflect an amount of value stored in a particular account associated with a user. The amount of value may include a quantity of currency.

The server computer system 120 maintains the database 130. The database 130 maintains a trust score for one or more data records maintained by one or more third party servers. The trust score may be a numerical value that represents a degree of trust associated with a particular data record. Put another way, the trust score may represent a degree of risk associated with a particular data record. The trust score may be a number between zero (0) and ten (10) where a trust score of zero (0) indicates a zero (or no) degree of trust and a trust score of ten (10) indicates a high degree of trust. The database 130 may maintain a look-up table that associates trust scores with one or more particular data records. The look-up table may be used or consulted to identify whether or not one or more transfer features should be enabled when configuring a transfer of data to a particular data record maintained by a third party server. The server computer system 120 may communicate signals to the database 130 to update the trust score for the one or more data records and this may be based on successful or unsuccessful transfers of data to the one or more data records.

The trust score maintained by the database 130 may be based on previous data transfers configured by the server computer system 120 to a particular data record. For example, each time a transfer configured by the server computer system 120 has been completed to the particular data record, the server computer system 120 may send a signal to the database 130 to update the trust score for the particular data record. Put another way, the server computer system 120 may track all transfers made by all customer accounts maintained by the institution associated with the server computer system 120 to the particular data record and may send a signal to the database 130 to update the trust score for the particular data record based on the successful or unsuccessful completion of each transfer. In this manner, the server computer system 120 may utilize the full customer base of the institution to generate the trust score for the particular data record.

The trust score may be additionally or alternatively be based on a volume of previous data transfers configured by the server computer system 120 to the particular data record. For example, as more transfers are made to the particular data record, the trust score associated with the particular data record may be increased to indicate that the particular data record has become more trustworthy. The trust score may be increased by the database 130 responsive to the server computer system 120 sending a signal to the database 130 requesting that the trust score associated with the particular data record be increased.

The trust score may additionally or alternatively be based on past errors in transfers configured by the server computer system 120 to the particular data record. For example, if a transfer to the particular data record failed, then the trust score associated with the particular data record may be decreased. The trust score may be decreased by the database 130 responsive to the server computer system 120 sending a signal to the database 130 requesting that the trust score associated with the particular data record be decreased.

The database 130 may be accessed by one or more third party servers (not shown). For example, the server computer system 120 may provide an application programming interface (API) that may be used by one or more third party servers to access the database 130. The one or more third party servers may have read-only access to the database 130 via the API.

The transfer protocol server 140 may facilitate transfers between data records using one or more transfer protocols. A data transfer request may include a request to transfer data from a first data record maintained by the server computer system 120 to a second data record maintained by a third party server computer system. For example, the server computer system 120 may initiate the transfer of data by sending a signal to the transfer protocol server 140 that includes a request to transfer data to a particular data record maintained by a particular institution. The transfer protocol server 140 may analyze the request to identify which transfer protocol is to be used and may complete the data transfer using the identified transfer protocol. In this embodiment, the transfer protocol server 140 may be configured to complete data transfers using one or more transfer protocols. In another embodiment, multiple transfer protocol servers may be used where each transfer protocol server is configured to complete data transfers using a particular transfer protocol. The transfer protocol server 140 may be associated with a third party that is different from the institution associated with the server computer system 120.

The client device 110, the server computer system 120 and the transfer protocol server 140 may be in geographically disparate locations. Put differently, the client device 110 may be remote from the server computer system 120 and/or the transfer protocol server 140.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, or the like.

Figure 2A:
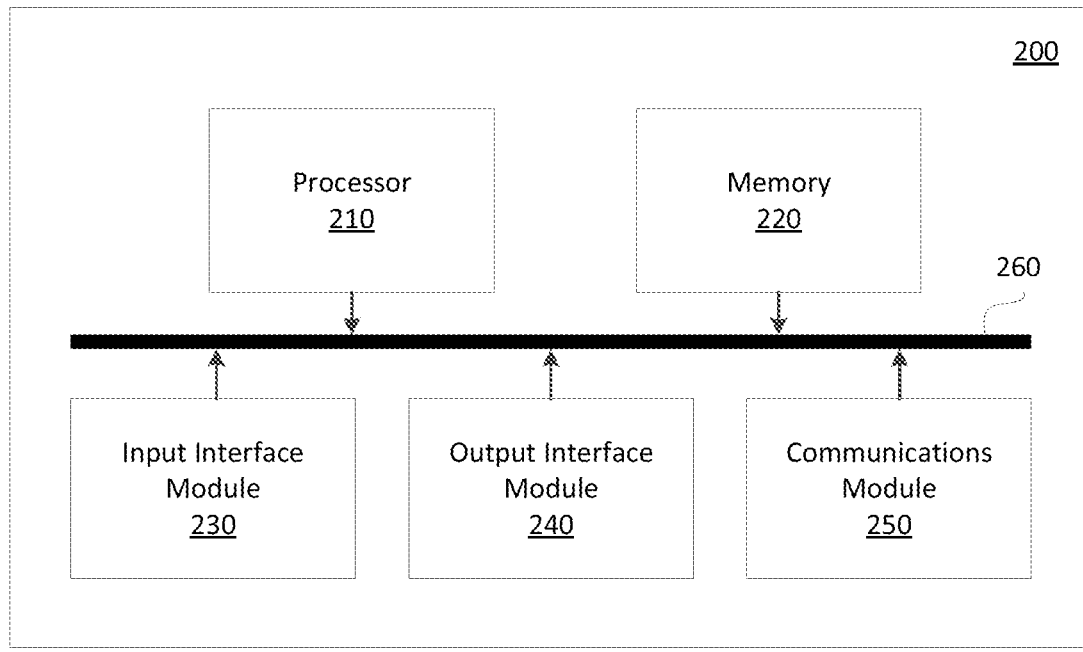
FIG. 2A is a high-level schematic diagram of an example computing device.

FIG. 2A is a high-level operation diagram of an example computing device 200. In some embodiments, the example computing device 200 may be exemplary of one or more of the client device 110, the server computer system 120 and the transfer protocol server 140. The example computing device 200 includes a variety of modules. For example, as illustrated, the example computing device 200, may include a processor 210, a memory 220, an input interface module 230, an output interface module 240, and a communications module 250. As illustrated, the foregoing example modules of the example computing device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
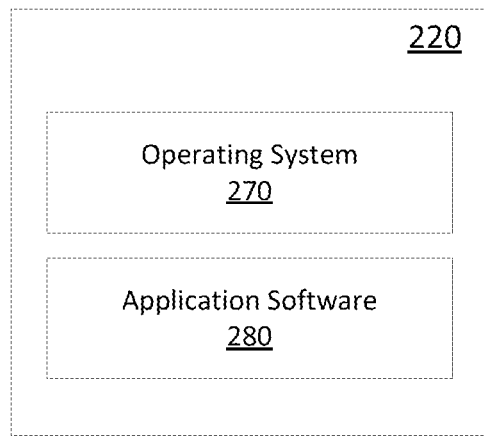
FIG. 2B is a schematic block diagram showing a simplified organization of software components stored in memory of the example computing device of FIG. 2A.

FIG. 2B depicts a simplified organization of software components stored in memory 220 of the example computing device 200. As illustrated these software components include an operating system 270 and application software 280.

The operating system 270 is software. The operating system 270 allows the application software 280 to access the processor 210, the memory 220, the input interface module 230, the output interface module 240 and the communications module 250. The operating system 270 may be, for example, Apple iOS™, Google Android™, Linux™ Microsoft Windows™, or the like.

The application software 280 adapts the example computing device 200, in combination with the operating system 270, to operate as a device performing particular functions. In some embodiments, the application software 280 may include a resource management application. The resource management application may, for example, be a personal banking application that enables users to perform various actions for managing their bank accounts using a personal computing device (e.g., laptop, mobile phone, etc.).

Through the resource management application, the server computer system 120 may provide a user interface that is displayed on a display screen of the client device 110. The user interface may include one or more fields that may be completed by a user of the client device 110 to initiate and/or configure a transfer of data.

The server computer system 120 may require information relating to the transfer of data such as for example information identifying a recipient of the data and as such the user may complete the one or more fields to provide this information to the server computer system 120. The information identifying the recipient of the data may include, for example, an email address or a telephone number of the recipient of the data, an account number identifying a data record associated with the recipient of the data, etc. In embodiments where the information identifying the recipient of the data includes the email address or the telephone number of the recipient, the server computer system 120 may use this information to identify a particular data record for receiving the data. For example, the server computer system 120 may send a signal to a third party server that includes the email address or the telephone number of the recipient of the data and requesting an account number identifying a data record associated with the recipient.

The server computer system 120 may require information relating to the type or amount of data that is to be transferred and as such the user may complete the one or more fields to provide this information to the server computer system 120. The request to transfer data may be a request to transfer computing resources or data. The request to transfer data may be a request to transfer resources such as for example an amount of value. The amount of value may include, for example, a quantity of currency. The server computer system 120 may additionally require, for example, a type of currency that is to be transferred.

The server computer system 120 may determine whether or not one or more transfer features should be enabled when configuring a transfer of data to a particular data record maintained by a third party server. For example, the server computer system 120 may determine whether or not a real-time transfer protocol is available to complete the data transfer. The real-time transfer protocol may include a real-time payment rail. The real-time payment rail may be hosted by a real-time payment system that includes a real-time payment server.

In at least some embodiments, the real-time payment system is associated with a third-party and is configured to receive a data transfer request. The data transfer request may include a request to transfer data from a first data record to a second data record. The first data record may include a data record associated with a sender and the second data record may include a data record associated with a receiver. The first data record may be associated with a first financial institution and the second data record may be associated with a second financial institution.

The request to transfer data may be a request to transfer resources such as for example an amount of value. The amount of value may include a quantity of currency. The sender may initiate the data transfer request using, for example, a computing device.

The request to transfer data may be formatted as an ISO 20022 message and may include one or more parameters. The ISO 20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO 20022 format is a data-rich messaging format that provides the real-time data transfer rail with a clear and nuanced format of data, the likelihood of errors and thus processing delays is minimized and as a result the real-time data transfer rail is able to facilitate data transfers in real-time.

Responsive to receiving the request to transfer data, the real-time payment system may complete the data transfer using the real-time payment rail. Specifically, the real-time payment server is configured to receive the request to transfer data and to facilitate the transfer of the data from the first data record associated with the sender to the second data record associated with the receiver in real-time.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

Data transfer using the real-time transfer protocol may be irrevocable, that is, the sender cannot retrieve the data transfer after it has been sent. The server computer system 120 may determine whether one or more transfer features should be enabled when configuring a data transfer request to a particular data record. For example, the server computer system 120 may obtain a trust score or a risk score for the particular data record and this may be used to determine whether or not one or more transfer features associated with a real-time transfer protocol should be enabled for configuring the transfer of the data.

Figure 3:
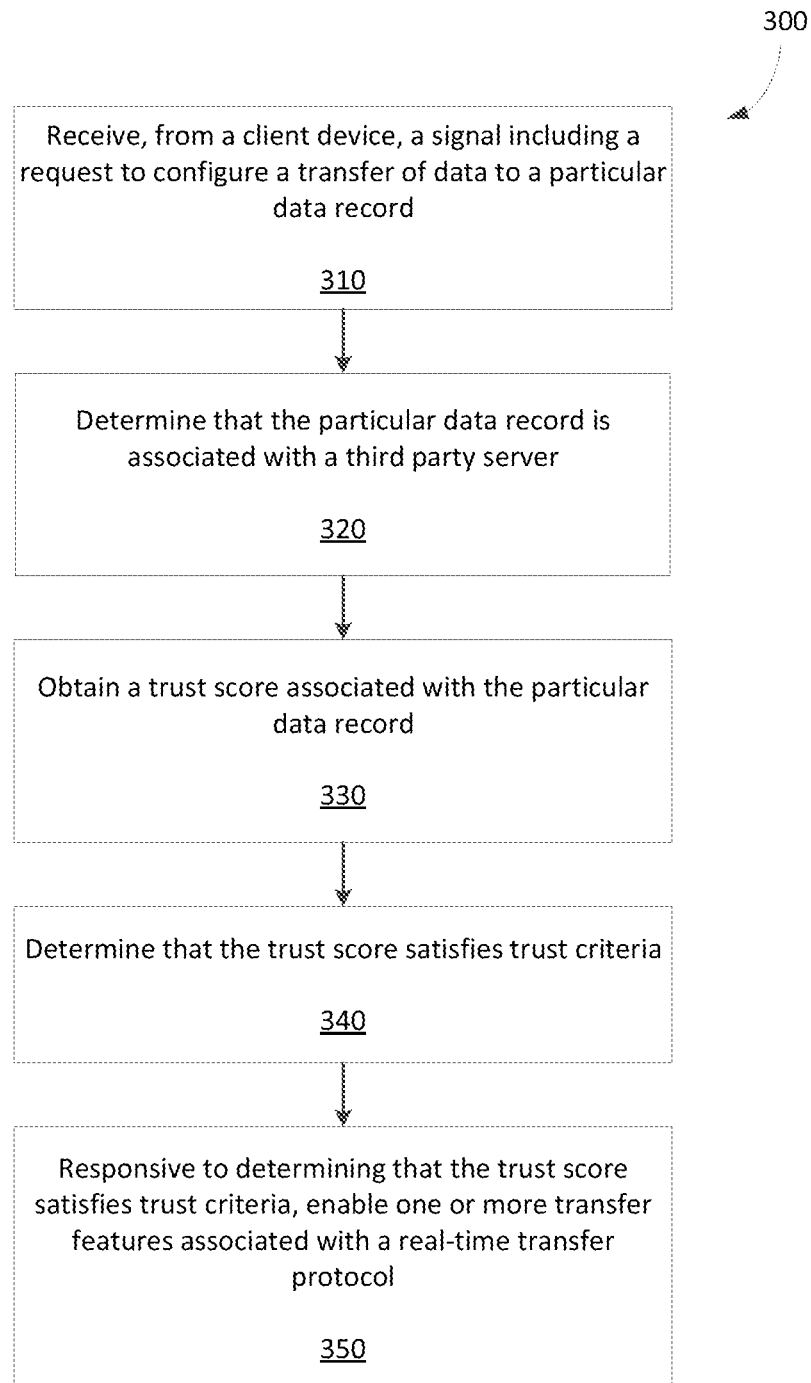
FIG. 3 shows, in flowchart form, an example method for enabling one or more transfer features associated with a real-time transfer protocol.

Reference is made to FIG. 3, which illustrates, in flowchart form, a method 300 for enabling one or more transfer features associated with a real-time transfer protocol. The method 300 may be implemented by a computing device having suitable processor-executable instructions for causing the computing device to carry out the described operations. The method 300 may be implemented, in whole or in part, by the server computer system 120. The server computer system 120 may off-load some operations of the method 300 to the client device 110 and/or the transfer protocol server 140 (FIG. 1).

The method 300 includes receiving, via a user interface displayed on a client device, a signal including a request to configure a transfer of data to a particular data record (step 310).

The request to configure a transfer of data may include a request to transfer computing resources or data. As an example, the request to configure a transfer of data may include a request to transfer data between nodes of a network. As another example, the request to configure a transfer of data may include a request to deliver data such as audio or video over an internet protocol (IP) network. As another example, the request to configure a transfer of data may include a request to transfer resources such as for example an amount of value. The amount of value may include, for example, a quantity of currency. The server computer system 120 may additionally require, for example, a type of currency that is to be transferred.

The request to configure a transfer of data may include information identifying a recipient. For example, where the request to configure a transfer of data includes a request to transfer computing resources, the request may include an IP address of a node associated with the recipient. As another example, where the request to configure a transfer of data includes a request to transfer resources, the request may include information identifying the recipient. For example, the request to transfer resources may be an e-transfer request and the information identifying the recipient may include an email address or a telephone number of the recipient.

The method 300 includes determining that the particular data record is associated with a third party server (step 320).

In embodiments where the data to be transferred includes computing resources, the particular data record for receiving the data may be determined to be associated with a third party server based on, for example, a web address, an IP address, etc. In at least some embodiments, the particular data record may include or may be associated with a node of a network and may be associated with a third party server.

In embodiments where the data to be transferred includes resource data, the request to transfer data may include information identifying the recipient. For example, the request to transfer data may include an email address or a telephone number of the recipient. In one or more embodiments, the information identifying the recipient may be used to determine that the particular data record is associated with a third party server.

To determine whether or not the particular data record is associated with the third party server, the server computer system 120 may send a signal to a database associated therewith to determine if the recipient has a data record maintained by the institution associated with the server computer system 120. Put another way, the server computer system 120 may perform a check to determine if the recipient is a customer that has an account at the institution associated with the server computer system 120.

Responsive to receiving the signal from the server computer system 120, the database may perform a lookup using the information identifying the recipient to determine whether or not the recipient has a data record maintained thereby. For example, the information identifying the recipient may include an email address and the database may perform a look-up using the email address.

When it is determined that the recipient has a data record maintained by the institution associated with the server computer system 120, the database may generate a signal that includes information identifying the particular data record associated with the recipient. Additionally or alternatively, the database may generate a binary response "YES" indicating that the recipient has a data record maintained by the institution associated with the server computer system 120.

When it is determined that the recipient does not have a data record maintained by the institution associated with the server computer system 120, the database may generate a binary response "NO" indicating that the recipient does not have a data record maintained by the institution associated with the server computer system 120.

The server computer system 120 analyzes the signal received from the database to determine whether or not the recipient has a data record maintained by the institution associated therewith. For example, the signal may include information identifying the particular data record associated with the recipient and/or may include a binary response signal "YES" indicating that the recipient has a data record maintained by the institution associated with the server computer system 120. Responsive to receiving the signal including information identifying the particular data record associated with the recipient and/or indicating that the recipient has a data record maintained by the institution associated with the server computer system 120, the server computer system 120 determines that the particular data record is not associated with a third party server. Since the particular data record is maintained by the institution associated with the server computer system 120, the server computer system 120 determines that the particular data record satisfies trust criteria and the method continues to step 350, as will be described in more detail below.

As another example, the signal may include a binary response signal "NO" indicating that the recipient does not have a data record maintained by the institution associated with the server computer system 120. Responsive to determining that the recipient does not have a data record maintained by the institution associated with the server computer system 120, the server computer system 120 determines that the particular data record is associated with a third party server.

Figure 4:
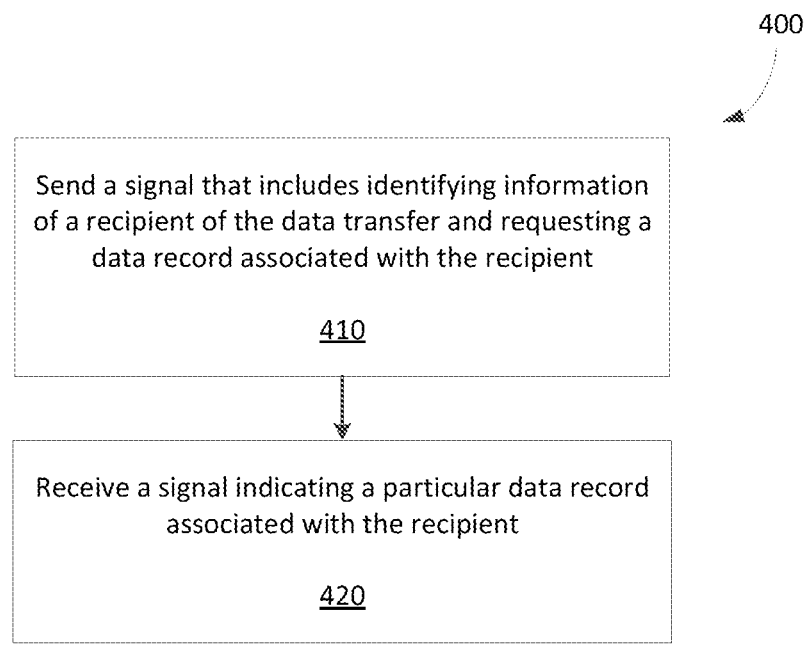
FIG. 4 shows, in flowchart form, an example method for identifying a particular data record for receiving the data.

When it is determined that the particular data record is associated with the third party server, the server computer system 120 may analyze the information identifying the recipient to identify the particular data record. Reference is made to FIG. 4 which illustrates, in flowchart form, a method 400 for identifying a particular data record. The method 400 may be implemented by a computing device having suitable processor-executable instructions for causing the computing device to carry out the described operations. The method 400 may be implemented, in whole or in part, by the server computer system 120. The server computer system 120 may off-load some operations of the method 400 to the client device 110 and/or the transfer protocol server 140 (FIG. 1).

The method 400 includes sending a signal that includes identifying information of a recipient of the data transfer and requesting a data record associated with the recipient (step 410).

In this embodiment, the signal may be sent to a third party server, the signal including the identifying information of the recipient and requesting a data record associated with the recipient. In this embodiment, the third party server may be associated with an institution such as for example an interbank network that links financial institutions and other enterprises for the purposes of exchanging electronic financial transactions and/or an institution that conducts funds transfers such as for example e-transfers. The third party server may be the transfer protocol server 140.

The third party server may maintain a database that associates email addresses with data records. For example, the database may include a list of email addresses for users that have signed up for a service hosted by the third party server and that includes information identifying a data record associated with each email address. The service may be, for example, an automatic deposit service.

Responsive to receiving the signal, the third party server may perform a lookup using the identifying information of the recipient to identify or determine a particular data record of the recipient. Responsive to identifying the particular data record of the recipient, the third party server may generate a signal that indicates a particular data record associated with the recipient.

The particular data record may be identified using, for example, a bank account number that includes a routing number, a transit number and an account number. The routing number may include a five (5) digit transit number identifying a branch where an account is held. The transit number may include a three (3) digit institution number corresponding to an institution associated with the account. The account number may identify the account and may include between seven (7) and twelve (12) digits, for example. The particular data record may additionally or alternatively be identified using, for example, an International Bank Account Number (IBAN) or any other standard that may be validated using a specially programmed computing device.

The method 400 includes receiving a signal indicating a particular data record associated with the recipient (step 420).

The signal sent from the third party server is received by the server computer system 120. As mentioned, the particular data record may be identified using a bank account number and/or an IBAN. As such, the server computer system 120 receives a signal that indicates the particular data record associated with the recipient.

Turning back to FIG. 3, the method 300 includes obtaining a trust score associated with the particular data record (step 330).

To obtain the trust score associated with the particular data record, the server computer system 120 may send a signal to a database requesting the trust score associated with the particular data record. In this embodiment, the database may include the database 130 that maintains a trust score for one or more data records maintained by one or more third party servers. As mentioned, the trust score may be a numerical value that represents a degree of trust associated with a particular data record. Put another way, the trust score may represent a degree of risk associated with a particular data record. The trust score may be a number between zero (0) and ten (10) where a trust score of zero (0) indicates a zero (or no) degree of trust and a trust score of ten (10) indicates a high degree of trust.

The trust score maintained by the database may be based on previous data transfers configured by the server computer system 120 to the particular data record. For example, each time a transfer has been completed from a data record of the institution associated with the server computer system 120 to the particular data record, the server computer system 120 may send a signal to the database to update the trust score for the particular data record. Put another way, the server computer system 120 may track all transfers made by all customer accounts maintained by the institution associated with the server computer system 120 to the particular data record and may send a signal to the database to update the trust score for the particular data record based on the successful or unsuccessful completion of each transfer. In this manner, the server computer system 120 may utilize the full customer base of the institution to generate the trust score for the particular data record.

The trust score may be additionally or alternatively be based on a volume of previous data transfers configured by the server computer system 120 to the particular data record. For example, as more transfers are made to the particular data record, the trust score associated with the particular data record may be increased to indicate that the particular data record has become more trustworthy. The trust score may be increased by the database responsive to the server computer system 120 sending a signal to the database requesting that the trust score associated with the particular data record be increased.

The trust score may additionally or alternatively be based on past errors in transfers configured by the server computer system 120 to the particular data record. For example, if a transfer to the particular data record failed, then the trust score associated with the particular data record may be decreased. The trust score may be decreased by the database responsive to the server computer system 120 sending a signal to the database requesting that the trust score associated with the particular data record be decreased.

The trust score may additionally or alternatively include transfer pattern data. The transfer pattern data may define parameters of typical transfers made to the particular data record. For example, it may be determined that a particular data record typically receives transfers within a particular range such as for example between $40 and $60. The trust score may include parameters that define such transfer pattern data. Additional parameters may include, for example, a location of accounts that make transfers to the particular data record. The location may specify a country, for example.

In some embodiments, the trust score may be determined by engaging an artificial intelligence or machine learning module trained to determine risk for data records based on previous transfers made to the data records. For example, training data that includes historical data of transfers made to data records may be used to train the module and as such the trained module may be able to more accurately determine a trust score for a particular data record and/or may be able to determine a trust score for a particular data record using a small dataset indicating transfers made to the particular data record.

The signal requesting the trust score associated with the particular data record may include information identifying the particular record. For example, the signal may include the information identifying the recipient such as for example the email address or telephone number. As another example, the signal may include the information identifying the particular data record, such as the bank account number of the recipient. It will be appreciated that the signal requesting the trust score associated with the particular data record may include both the information identifying the recipient and the information identifying the particular data record.

Responsive to receiving the signal, the database may perform a look-up of the particular data record to obtain the trust score associated therewith. For example, the database may perform a look-up using the information identifying the recipient such as for example the email address of the recipient and/or may perform a look-up using the information identifying the particular data record such as for example the bank account number of the recipient.

The method 300 includes determining that the trust score satisfies trust criteria (step 340).

In this embodiment, the trust criteria may include a trust threshold. The server computer system 120 may compare the trust score to the trust threshold to determine whether or not the trust score satisfies the trust criteria. Specifically, when it is determined that the trust score is above the trust threshold the trust score is determined to satisfy the trust criteria. A trust score above the trust threshold indicates that the particular database is deemed trustworthy.

When it is determined that the trust score is below the trust threshold the trust score is determined to not satisfy the trust criteria. A trust score below the trust threshold indicates that the particular database is not deemed trustworthy.

The trust threshold may be the same for all data records or may be dependent on various criteria. In one or more embodiments, the trust threshold may be dependent on an amount of resources to be transferred. For example, the trust threshold may be five (5) for a transfer of resources below $1000, may be six (6) for a transfer of resources between $1000 and $2500, and may be seven (7) for a transfer of resources above $2500.

In one or more embodiments, the trust threshold may be dependent on a type of resource to be transferred. For example, the trust threshold may be five (5) for a transfer of resources that do not require foreign currency exchange and the trust threshold may be seven (7) for a transfer of resources that require foreign currency exchange.

In one or more embodiments, the trust threshold may be dependent on an institution associated with the particular data record. For example, using the bank account number, the server computer system 120 may identify the institution associated with the particular data record and the trust threshold may be five (5) for an institution that is recognized as trustworthy and the trust threshold may be seven (7) for an institution that is not recognized or is not recognized as trustworthy.

In one or more embodiments, the trust threshold may be dependent on multiple criteria. For example, the server computer system 120 may consider various criteria based on the data transfer request and based on the particular data record and each determination may increase or decrease a baseline trust threshold. The baseline trust threshold may be initially set as five (5). In this example, the transfer of resources may be less than $1000 and this may decrease the trust threshold by one (1) point and as such the trust threshold may be decreased from five (5) to four (4). It may further be determined that the particular data record is associated with an institution that is not recognized by the server computer system 120 and this may increase the trust threshold by two (2) points and as such the trust threshold may be increased from four (4) to six (6).

The determination as to whether or not the trust criteria is satisfied may additionally or alternatively be based on the transfer pattern data. In one or more embodiments, the server computer system 120 may determine that the trust criteria is satisfied when it is determined that the transfer being initiated matches the transfer pattern data. For example, if the transfer pattern data indicates that the particular data record typically receives between $40 and $60 and the transfer being initiated is for $50, it may be determined that the trust criteria is satisfied. As another example, if the transfer pattern data indicates that the particular data record typically receives between $40 and $60 but the transfer being initiated is for $100,000, it may be determined that the trust criteria is not satisfied.

Responsive to determining that the trust score satisfies trust criteria, the method 300 includes enabling one or more transfer features associated with a real-time transfer protocol (step 350).

In embodiments where the data to be transferred includes computing resources, the server computer system 120 may enable one or more transfer features associated with a real-time transfer protocol. For example, the server computer system 120 may determine that a node associated with the particular data record may be connected to a trusted network that supports real-time transfer protocols such as for example the Secure Real-Time Transport Protocol (SRTP). As such, the server computer system may enable one or more transfer features associated with the real-time transfer protocol.

In embodiments where the data to be transferred includes resource data, the server computer system 120 may enable one or more transfer features associated with a real-time transfer protocol. The real-time transfer protocol may include a real-time payment rail. The real-time payment rail may be hosted by a real-time payment system that includes a real-time payment server.

The one or more transfer features associated with the real-time payment rail may be associated with enabling the real-time payment rail for the transfer of the data. Put another way, the one or more transfer features may be enabled to indicate that the real-time payment rail is available to complete the transfer and to allow the user to select the real-time payment rail to complete the transfer.

It will be appreciated that the real-time payment rail may not be available to particular data records that have trust scores that do not satisfy the trust criteria. Put another way, the real-time payment rail may only be available for particular data records that have trust scores that satisfy the trust criteria. In another embodiment, the real-time payment rail may be available to particular data records that have trust scores that do not satisfy the trust criteria but in a limited capacity. For example, the real-time payment rail may be available to particular data records that have trust scores that do not satisfy the trust criteria but only for transfers below a transfer threshold or transfer limit. For example, only transfers under $1000 may be made using the real-time payment rail for particular data records that have trust scores that do not satisfy the trust criteria.

Enabling the real-time payment rail may include adjusting a user interface displayed on the client device. The user interface may be dynamic in that certain options may be selectively displayed on the user interface based on the trust score. For example, responsive to determining that the trust score satisfies the trust criteria, the server computer system 120 may adjust certain user interface features based on the trust score.

The one or more transfer features may include updating the user interface to indicate that the real-time transfer protocol is available. For example, the server computer system 120 may send a signal modifying a user interface displayed on the client device indicating the enabling of the one or more transfer features associated with the real-time transfer protocol.

The one or more transfer features may include enabling a selectable option on the user interface displayed on the client device indicating the enabling of the one or more transfer features associated with the real-time transfer protocol. For example, the server computer system 120 may send a signal enabling a selectable option on the user interface displayed on the client device to initiate the transfer of the data using the real-time transfer protocol.

The one or more transfer features may include enabling an increased transfer threshold for the transfer using the real-time transfer protocol. For example, transfers made using the real-time payment rail may have a transfer threshold or transfer limit of $1000 for any particular data records that do not have a trust score that satisfies the trust criteria. When it is determined that the trust score for a particular data record satisfies the trust criteria, the transfer threshold may be increased to $2500. The transfer threshold may be dependent on the trust score. For example, a trust score of (6) may increase the transfer threshold to $2500 and a trust score of eight (8) may increase the transfer threshold to $5000. The server computer system 120 may send a signal to update the user interface displayed on the client device to display the increased transfer threshold.

The one or more transfer features may include displaying a notification indicating that the particular data record can be trusted. For example, the server computer system 120 may send a signal causing the user interface displayed on the client device to display a notification indicating that the particular data record can be trusted and/or indicating that the real-time payment rail is available for transfers made to the particular data record.

As mentioned, data transfer using the real-time transfer protocol may be irrevocable, that is, the sender cannot retrieve the data transfer after it has been sent. As described herein, the server computer system 120 may obtain a trust score for a particular data record and may determine whether one or more transfer features associated with the real-time transfer protocol should be enabled when configuring a data transfer request to a particular data record. In this manner, only data records that are deemed trustworthy may be eligible for transfers made using the real-time transfer protocol.

Figure 5:
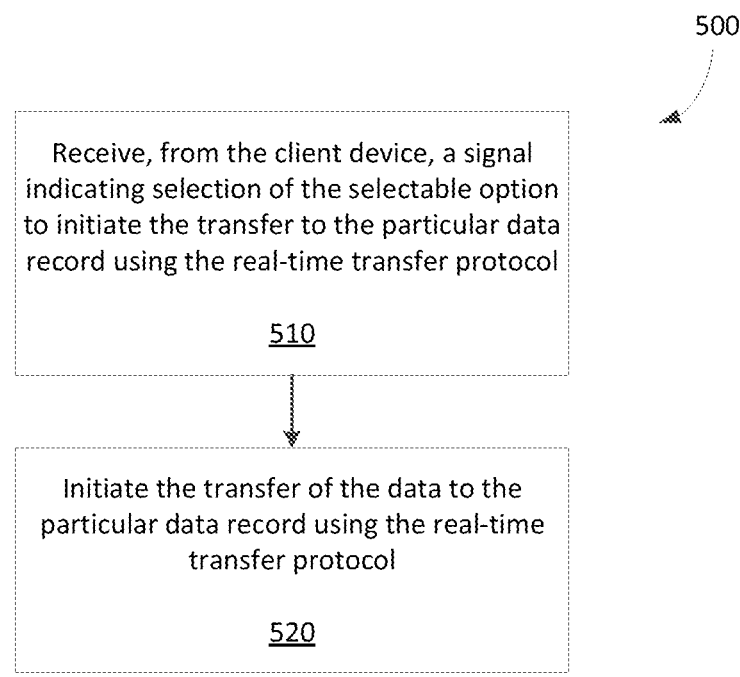
FIG. 5 shows, in flowchart form, an example method for initiating a data transfer using a real-time transfer protocol.

As mentioned, the one or more transfer features may include enabling a selectable option on the user interface displayed on the client device indicating the enabling of the one or more transfer features associated with the real-time transfer protocol. The user may select the selectable option to initiate the transfer using the real-time transfer protocol. Reference is made to FIG. 5, which illustrates, in flowchart form, a method 500 for initiating the data transfer using the real-time transfer protocol. The method 500 may be implemented by a computing device having suitable processor-executable instructions for causing the computing device to carry out the described operations. The method 500 may be implemented, in whole or in part, by the server computer system 120. The server computer system 120 may off-load some operations of the method 500 to the client device 110 and/or the transfer protocol server 140 (FIG. 1).

The method 500 includes receiving, from the client device 110, a signal indicating selection of the selectable option to initiate the transfer using the real-time transfer protocol (step 510).

In this embodiment, responsive to the user selecting the selectable option displayed on the client device 110, the client device 110 sends a signal indicating selection of the selectable option to initiate the transfer using the real-time transfer protocol to the server computer system 120.

Responsive to receiving the signal indicating selection of the selectable option, the method 500 includes sending a signal to the transfer protocol server 140 to initiate the transfer of the data to the particular data record using the real-time transfer protocol (step 520).

In this embodiment, the server computer system 120 may generate a data transfer request and communicate the data transfer request to the transfer protocol server 140. In embodiments where the real-time transfer protocol includes a real-time payment rail, the transfer request may be formatted and encrypted as an ISO 20022 message and may include one or more parameters. The one or more parameters may be included as metadata in the data transfer request. The one or more parameters may include resource definition data that defines the nominal value. The transfer request is sent to the transfer protocol server 140.

The data transfer request may be formatted as an ISO 20022 message and may include one or more parameters. The ISO 20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO 20022 format is a data-rich messaging format that provides the real-time data transfer rail with a clear and nuanced format of data, the likelihood of errors and thus processing delays is minimized and as a result the real-time payment rail is able to facilitate data transfers in real-time.

Responsive to receiving the data transfer request, the real-time payment system may complete the data transfer request using the real-time payment rail. Specifically, the real-time payment server is configured to receive the data transfer request and to facilitate the data transfer from a data record associated with the sender to the particular data record associated with the receiver in real-time. In at least some embodiment, the data transfer is irrevocable, that is, the sender cannot retrieve the data transfer after it has been sent.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

Figure 6:
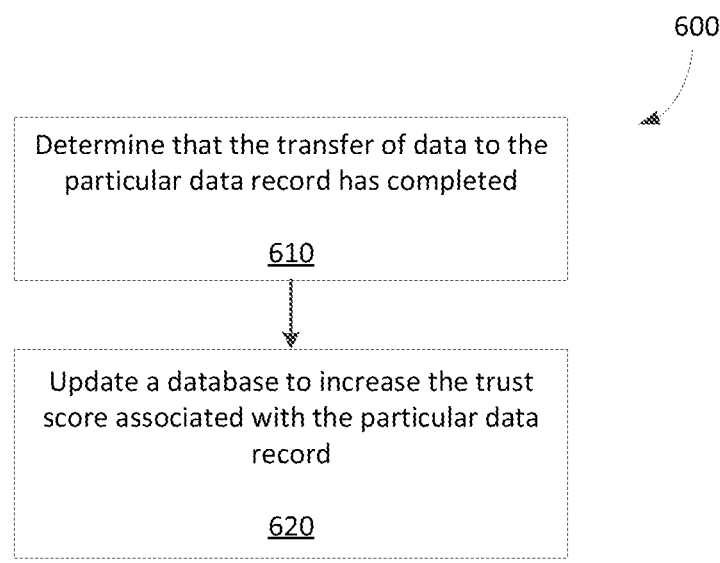
FIG. 6 shows, in flowchart form, an example method for updating a database.

Responsive to completion of the data transfer, the server computer system 120 may update the database 130. Reference is made to FIG. 6, which illustrates, in flowchart form, a method 600 for updating the database 130. The method 600 may be implemented by a computing device having suitable processor-executable instructions for causing the computing device to carry out the described operations. The method 600 may be implemented, in whole or in part, by the server computer system 120. The server computer system 120 may off-load some operations of the method 600 to the client device 110 and/or the transfer protocol server 140 (FIG. 1).

The method 600 includes determining that the transfer of the data to the particular data record has completed (step 610).

In this embodiment, the transfer protocol server 140 may send a signal indicating confirmation of the data transfer using the real-time transfer protocol. Since the real-time transfer protocol is able to complete data transfer requests in real-time or near real-time, the server computer system 120 is able to determine that the transfer of data to the particular data record using the real-time transfer protocol has completed in real-time or near real-time.

The method 600 includes updating a database to increase the trust score associated with the particular data record (step 620).

Responsive to determining that the transfer of data to the particular data record using the real-time transfer protocol has completed, the server computer system 120 may send a signal to the database 130 to update the database to increase the trust score associated with the particular data record. In response, the database may update the trust score associated with the particular data record. It will be appreciated that in embodiments where the database does not have a trust score for the particular data record, the database may generate a trust score for the particular data record and may store the trust score in association with the particular data record for further use.

It will be appreciated that the above described methods and systems may be used to provide notifications regarding particular data records that have trust scores that do not satisfy trust criteria. Further, one or more transfer features may be enabled accordingly. For example, during method 300, a request may be received from a second client device that includes a second request to configure a transfer of data to a second particular data record (in accordance with step 310). It may be determined that the second particular data record is associated with a third party server (in accordance with step 320). A second trust score may be obtained for the second particular data record (in accordance with step 330). It may be determined that the second trust score does not satisfy trust criteria (in accordance with step 340). Responsive to determining that the second trust score does not satisfy trust criteria, the server computer system 120 may send a signal causing a second user interface displayed on the second client device to display a notification indicating that the second particular data record cannot be trusted. The server computer system 120 may additionally or alternatively enable a decreased transfer threshold and this may be based on the trust score for the particular data record. The server computer system 120 may update the second user interface to reflect the decreased transfer threshold. Specifically, the server computer system 120 may send a signal to update the second user interface displayed on the second client device to display the decreased transfer threshold. The server computer system 120 may disable the real-time transfer protocol and may update the second user interface to indicate that the real-time transfer protocol is not available for the second particular data record.

In embodiments described herein a database is maintained that stores trust scores for particular data records. The database may be made available to one or more third party servers. For example, the database may be configured as an application programming interface (API) that may be configured to receive API requests from one or more third party servers and to generate responses to such requests. The requests may include a request for a trust score for a particular data record. In exchange for providing the trust score for a particular data record, the database may require that the third party server provides information relating to past transfers made to particular data records for customer accounts maintained thereby. As such, the database may be updated using this additional information. The database may be continuously and/or periodically updated in manners similar to embodiments described herein.

Figure 7:
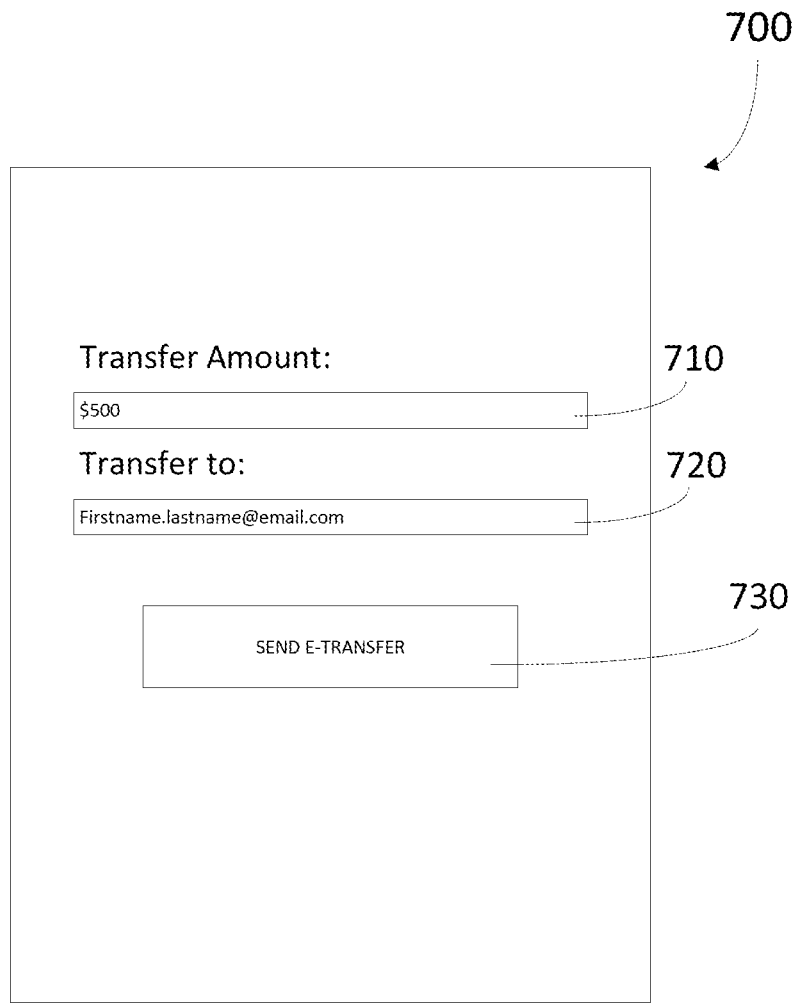
FIGS. 7 to 11 show example user interfaces.

Turning to FIG. 7, an example user interface 700 is shown. The user interface 700 may be a user interface associated with initiating a data transfer request using, for example, a non-real-time transfer protocol. The user interface 700 includes a first input field 710 associated with a transfer amount and a second input field 720 associated with identifying a recipient. The user interface 700 includes a selectable option 730 that, when selected, initiates a transfer of data.

Using the transfer amount and the information identifying the recipient, the server computer system 120 may perform operations as described herein to enable one or more transfer features associated with a real-time transfer protocol.

Figure 8:
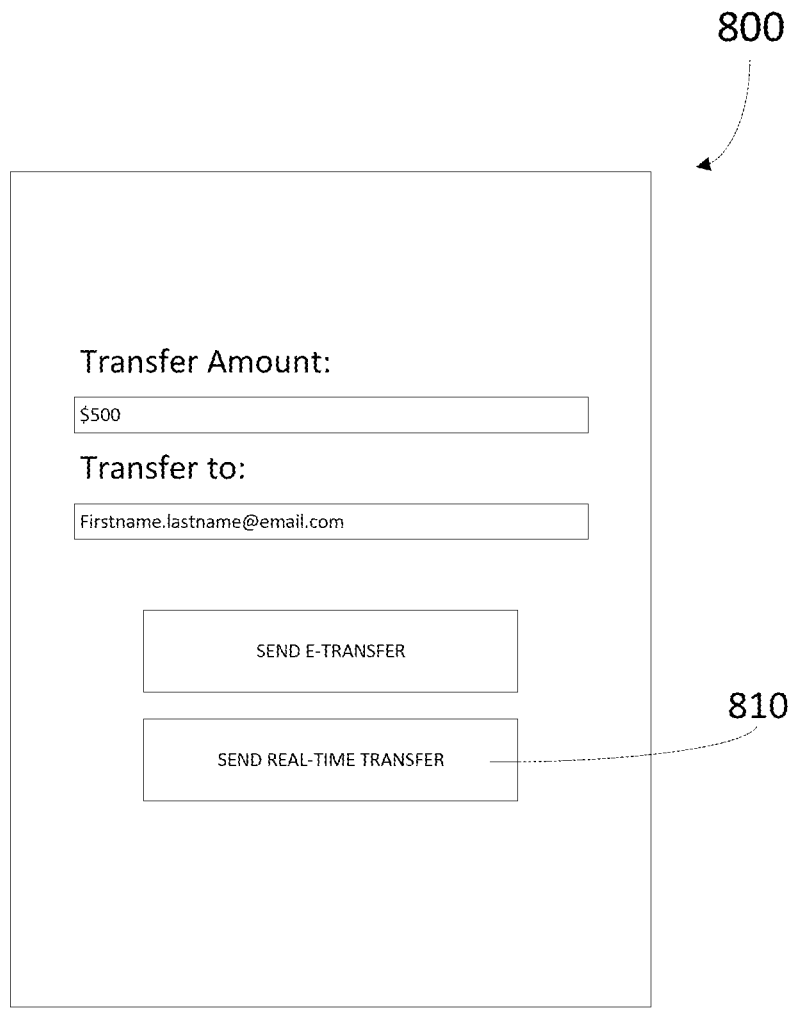

As mentioned, the one or more transfer features may include enabling a selectable option on the user interface displayed on the client device indicating the enabling of the one or more transfer features associated with the real-time transfer protocol. An example user interface 800 is shown in FIG. 8. The user interface 800 is similar to user interface 700 with the addition of a selectable option 810 associated with configuring a data transfer using the real-time transfer protocol. The selectable option 810 may be displayed in response to the server computer system 120 determining that the trust score associated with the particular data record satisfies trust criteria and this may be done using the email address used to identify the recipient in accordance with embodiments described herein.

Figure 9:
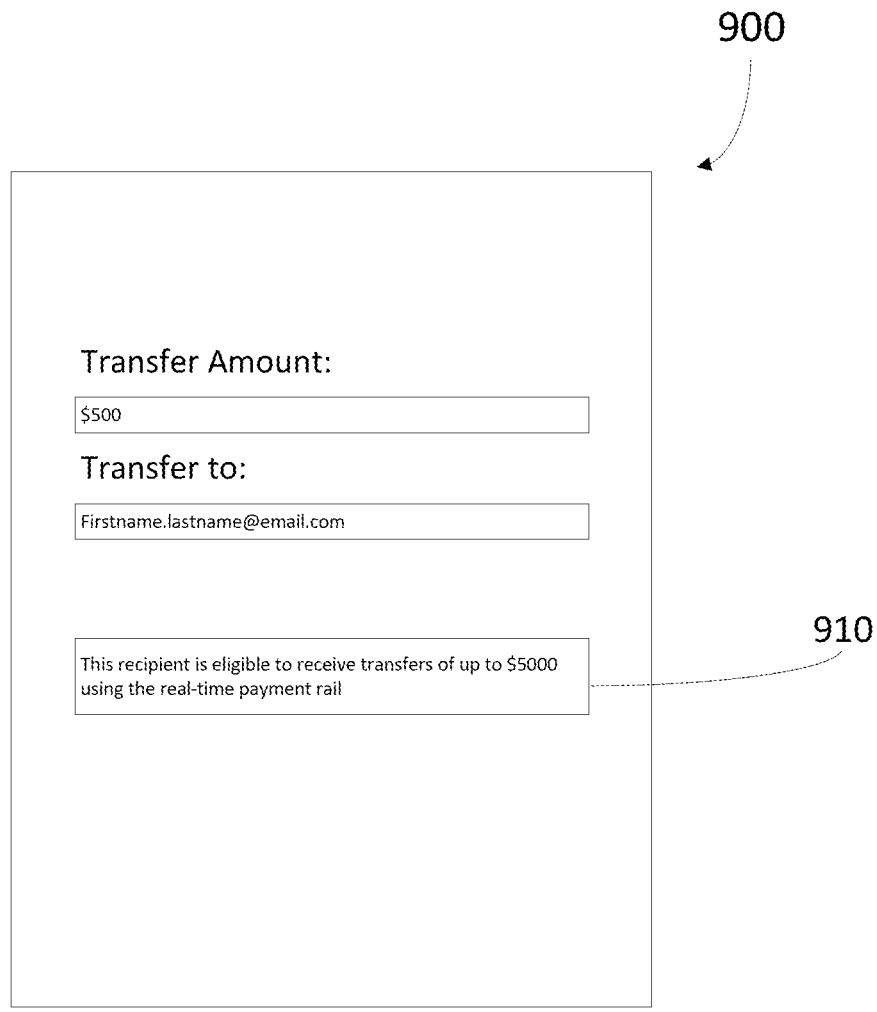

As mentioned, the one or more transfer features may include enabling an increased transfer threshold for the transfer using the real-time transfer protocol and the server computer system 120 may send a signal to update the user interface displayed on the client device to display the increased transfer threshold. An example user interface 900 is shown in FIG. 9. The user interface 900 is similar to user interface 700 with the addition of element 910 indicating that the recipient is eligible to receive transfers up to the increased transfer threshold of $5000 using the real-time transfer protocol.

Figure 10:
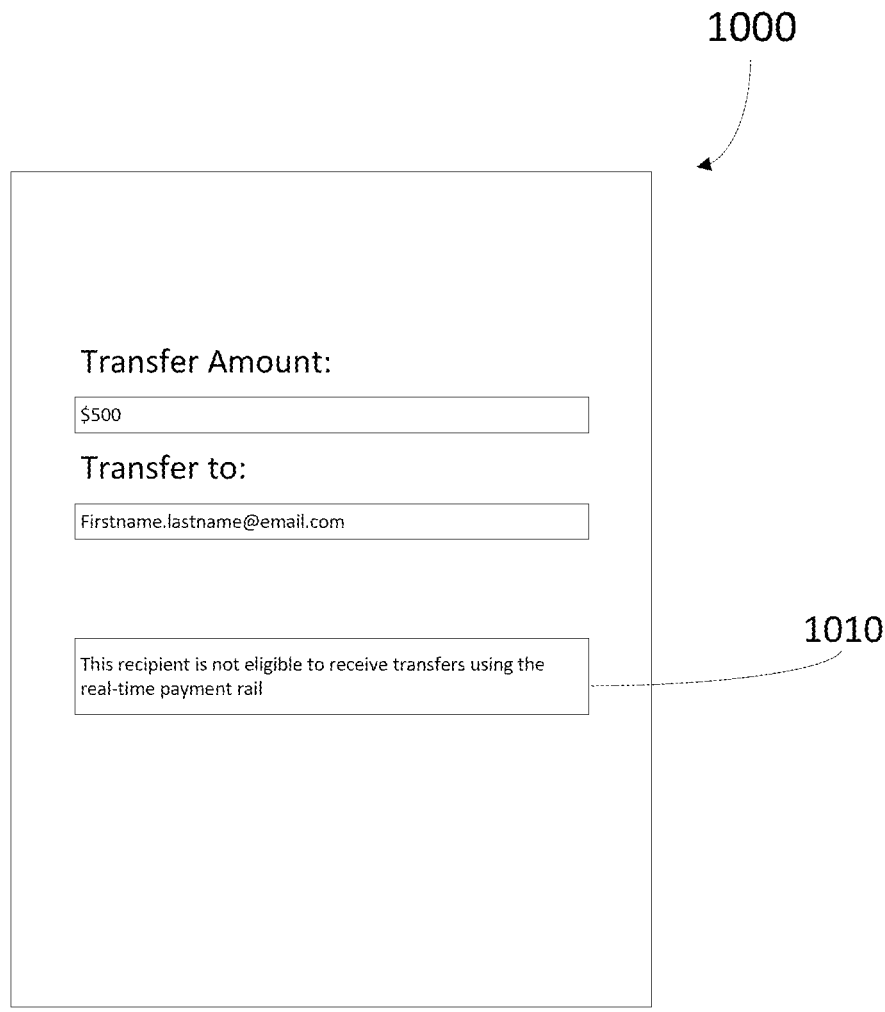

As described in embodiments herein, when it is determined that the trust score does not satisfy the trust criteria, the server computer system 120 may send a signal causing a user interface displayed on the client device to display a notification indicating that the particular data record cannot be trusted. An example user interface 1000 is shown in FIG. 10. The interface 1000 is similar to user interface 700 with the addition of element 1010 indicating that the particular data record cannot be trusted.

Figure 11:
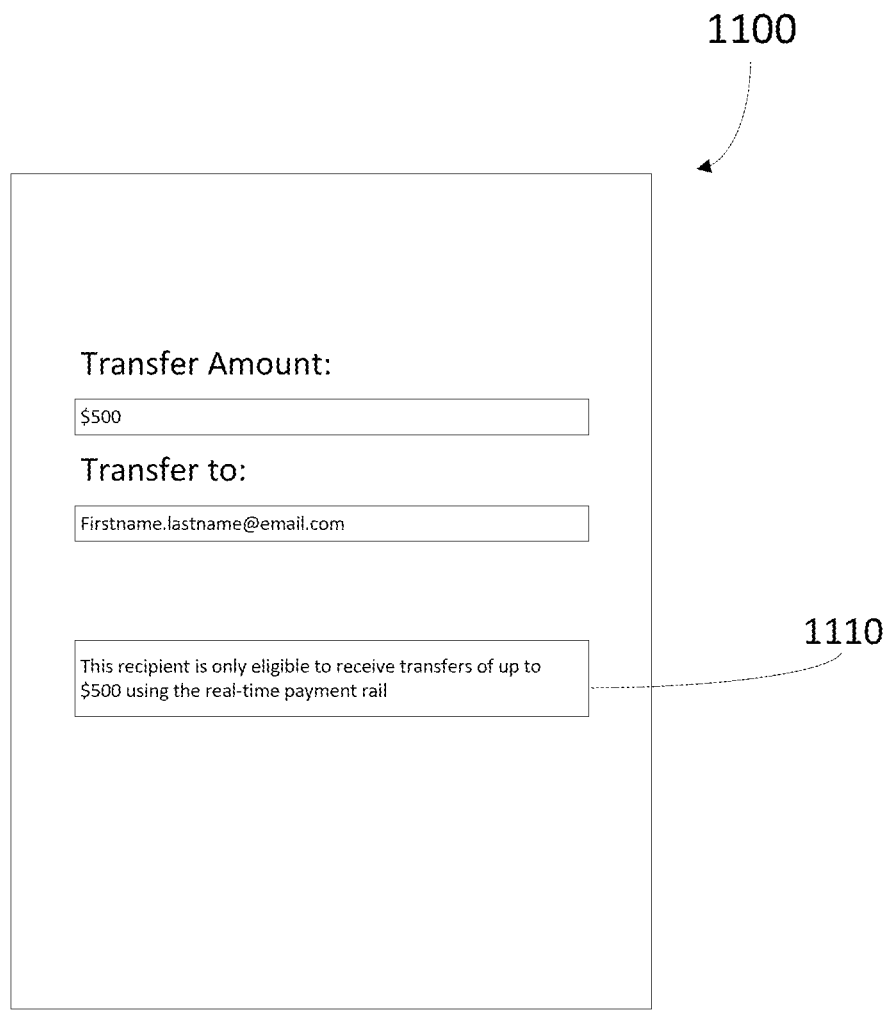

As described in embodiments herein, when it is determined that the trust score does not satisfy the trust criteria, the server computer system 120 may enable a decreased transfer threshold using the real-time transfer protocol and may send a signal to update the user interface displayed on the client device to display the decreased transfer threshold. An example user interface 1100 is shown in FIG. 11. The user interface 1100 is similar to user interface 700 with the addition of element 1110 indicating that the recipient is eligible to receive transfers up to the decreased transfer threshold of $500 using the real-time transfer protocol.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A server computer system, comprising:
   a processor;
   a communications module coupled to the processor; and
   a memory coupled to the processor, the memory storing instructions that, when executed, configure the processor to:
   receive, via the communications module and from a client device, a signal including a request to configure a transfer of data to a particular data record;
   obtain a trust score associated with the particular data record;
   determine that the trust score satisfies trust criteria; and
   responsive to determining that the trust score satisfies trust criteria, send, via the communications module and to the client device, a signal modifying a user interface displayed on the client device indicating the availability of a real-time transfer protocol.

2. The server computer system of claim 1, wherein when modifying the user interface displayed on the client device, the instructions, when executed, further configure the processor to:
   send, via the communications module and to the client device, a signal enabling a selectable option on the user interface displayed on the client device to initiate the transfer of the data to the particular data record using the real-time transfer protocol.

3. The server computer system of claim 2, wherein the instructions, when executed, further configure the processor to:
   receive, via the communications module and from the client device, a signal indicating selection of the selectable option to initiate the transfer to the particular data record using the real-time transfer protocol; and
   responsive to receiving the signal indicating selection of the selectable option to initiate the transfer to the particular data record using the real-time transfer protocol, initiate the transfer of the data to the particular data record using the real-time transfer protocol.

4. The server computer system of claim 3, wherein the instructions, when executed, further configure the processor to:
   determine that the transfer of the data to the particular data record using the real-time transfer protocol has completed; and
   responsive to determining that the transfer of the data to the particular data record using the real-time transfer protocol has completed, update a database to increase the trust score for the particular data record.

5. The server computer system of claim 1, wherein responsive to determining that the trust score satisfies trust criteria, the instructions, when executed, further configure the processor to:
   enable one or more transfer features associated with the real-time transfer protocol.

6. The server computer system of claim 5, wherein when enabling the one or more transfer features associated with the real-time transfer protocol, the instructions, when executed, further configure the processor to:
   enable an increased transfer threshold for the transfer using the real-time transfer protocol.

7. The server computer system of claim 6, wherein the increased transfer threshold is based on the trust score associated with the particular data record.

8. The server computer system of claim 1, wherein the trust criteria includes a trust threshold and determining that the trust score satisfies the trust criteria includes determining that the trust score is above the trust threshold.

9. The server computer system of claim 1, wherein when obtaining the trust score for the particular data record, the instructions, when executed, further configure the processor to:
   send, to a database, a signal that includes information identifying the particular data record and requesting the trust score associated with the particular data record.

10. The server computer system of claim 1, wherein the instructions, when executed, further configure the processor to:
    determine that the particular data record is associated with a third party server.

11. The server computer system of claim 1, wherein the real-time transfer protocol includes a real-time payment rail.

12. The server computer system of claim 1, wherein the instructions, when executed, further configure the processor to:
    receive, via the communications module and from a second client device, a signal including a second request to configure a second transfer of data to a second particular data record;
    obtain a second trust score associated with the second particular data record;
    determine that the second trust score does not satisfy the trust criteria; and
    responsive to determining that the second trust score does not satisfy the trust criteria, send, via the communications module and to the second client device, a signal causing a second user interface displayed on the second client device to display a notification indicating that the second particular data record cannot be trusted.

13. A computer-implemented method comprising:
receiving, from a client device, a signal including a request to configure a transfer of data to a particular data record;
obtaining a trust score associated with the particular data record;
determining that the trust score satisfies trust criteria; and
responsive to determining that the trust score satisfies trust criteria, send, to the client device, a signal modifying a user interface displayed on the client device indicating the availability of a real-time transfer protocol.

14. The computer-implemented method of claim 13, wherein when modifying the user interface displayed on the client device, the method further comprises:
sending, to the client device, a signal enabling a selectable option on the user interface displayed on the client device to initiate the transfer of the data to the particular data record using the real-time transfer protocol.

15. The computer-implemented method of claim 14, further comprising:
receiving, from the client device, a signal indicating selection of the selectable option to initiate the transfer to the particular data record using the real-time transfer protocol; and
responsive to receiving the signal indicating selection of the selectable option to initiate the transfer to the particular data record using the real-time transfer protocol, initiate the transfer of the data to the particular data record using the real-time transfer protocol.

16. The computer-implemented method of claim 15, further comprising:
determining that the transfer of the data to the particular data record using the real-time transfer protocol has completed; and
responsive to determining that the transfer of the data to the particular data record using the real-time transfer protocol has completed, updating a database to increase the trust score for the particular data record.

17. The computer-implemented method of claim 13, wherein responsive to determining that the trust score satisfies trust criteria, the method further comprises:
enabling one or more transfer features associated with the real-time transfer protocol.

18. The computer-implemented method of claim 17, wherein enabling the one or more transfer features associated with the real-time transfer protocol includes:
enabling an increased transfer threshold for the transfer using the real-time transfer protocol.

19. The computer-implemented method of claim 18, wherein the increased transfer threshold is based on the trust score associated with the particular data record.

20. The computer-implemented method of claim 13, wherein the trust criteria includes a trust threshold and determining that the trust score satisfies the trust criteria includes determining that the trust score is above the trust threshold.

21. The computer-implemented method of claim 13, wherein obtaining the trust score for the particular data record includes:
sending, to a database, a signal that includes information identifying the particular data record and requesting the trust score associated with the particular data record.

22. The computer-implemented method of claim 13, further comprising:
determining that the particular data record is associated with a third party server.

23. The computer-implemented method of claim 13, wherein the real-time transfer protocol includes a real-time payment rail.

24. The computer-implemented method of claim 13, further comprising:
receiving, from a second client device, a signal including a second request to configure a second transfer of data to a second particular data record;
obtaining a second trust score associated with the second particular data record;
determining that the second trust score does not satisfy the trust criteria; and
responsive to determining that the second trust score does not satisfy the trust criteria, sending, via the communications module and to the second client device, a signal causing a second user interface displayed on the second client device to display a notification indicating that the second particular data record cannot be trusted.

25. A non-transitory computer readable storage medium comprising processor-executable instructions which, when executed, configure a processor to:
receive, via a communications module and from a client device, a signal including a request to configure a transfer of data to a particular data record;
obtain a trust score associated with the particular data record;
determine that the trust score satisfies trust criteria; and
responsive to determining that the trust score satisfies trust criteria, send, via the communications module and to the client device, a signal modifying a user interface displayed on the client device indicating the availability of a real-time transfer protocol.

* * * * *